United States Patent
Mizuno

(10) Patent No.: US 7,760,609 B2
(45) Date of Patent: Jul. 20, 2010

(54) OPTICAL DISC APPARATUS

(75) Inventor: Takao Mizuno, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 469 days.

(21) Appl. No.: 11/870,944

(22) Filed: Oct. 11, 2007

(65) Prior Publication Data
US 2008/0089189 A1    Apr. 17, 2008

(30) Foreign Application Priority Data
Oct. 12, 2006    (JP)    ............... 2006-278331

(51) Int. Cl.
G11B 7/00    (2006.01)
(52) U.S. Cl. ............... 369/53.37; 369/30.1; 369/47.49; 369/47.54
(58) Field of Classification Search ............... 369/30.1, 369/44.26, 47.49, 47.54, 53.39, 231, 233
See application file for complete search history.

(56) References Cited

U.S. PATENT DOCUMENTS

| | | | |
|---|---|---|---|
| 6,445,649 | B1 | 9/2002 | Saito et al. |
| 7,072,253 | B2 * | 7/2006 | Yamamoto ............... 369/44.29 |
| 7,173,887 | B2 | 2/2007 | Kimikawa |
| 7,599,257 | B2 * | 10/2009 | Suzuki ............... 369/44.26 |
| 2001/0026509 | A1 * | 10/2001 | Kimikawa ............... 369/44.32 |
| 2004/0081037 | A1 * | 4/2004 | Jung et al. ............... 369/44.29 |
| 2005/0259539 | A1 | 11/2005 | Takeda |
| 2007/0070851 | A1 * | 3/2007 | Jung et al. ............... 369/53.29 |

FOREIGN PATENT DOCUMENTS

| | | |
|---|---|---|
| JP | 4-241229 A | 8/1992 |
| JP | 2000-251270 A | 9/2000 |
| JP | 2001-266375 A | 9/2001 |
| JP | 2005-332525 A | 12/2005 |

OTHER PUBLICATIONS

Japanese Office Action dated Sep. 16, 2008 w/English translation (four (4) pages).

* cited by examiner

*Primary Examiner*—Wayne R Young
*Assistant Examiner*—Adam R Giesy
(74) *Attorney, Agent, or Firm*—Crowell & Moring LLP

(57) ABSTRACT

An optical disc apparatus comprises an optical pickup with a thread load, a thread motor for moving the optical pickup, and an inner circumferential switch. When the optical pickup is moved to an innermost circumference of an optical disc to turn on the switch, the pickup is stopped, and the moving direction of the pickup is changed to the outer circumferential side. A driving voltage applied to the motor is gradually increased. The driving voltage, at which the pickup moving to the outer circumferential side causes the switch to be turned off, is set as an automatically adjusted value of the driving voltage applied to the motor. Thereafter, this automatically adjusted value, which corresponds to the thread load, is used to drive the motor. This makes it possible to absorb variations of thread loads and reduce variation in rezero operation, achieving cost reduction, without using a thread sensor.

2 Claims, 3 Drawing Sheets

OPTICAL DISC APPARATUS

BACKGROUND OF THE INVENTION

1. Field of the Invention

The present invention relates to an optical disc apparatus, and more particularly to the control of movement of an optical pickup.

2. Description of the Related Art

In an optical disc apparatus which irradiates a laser beam onto an optical disc for data recording/reproduction, it is required to accurately move an optical pickup for data writing/reading to a specified position. For example, when an optical disc is loaded or mounted, it is required to accurately move the optical pickup to a predetermined reading start position (hereafter referred to as "rezero position") so as to read certain data recorded in an innermost circumferential area of the optical disc (such operation being hereafter referred to as "rezero operation"). If a DC motor is used for moving the optical pickup, and a predetermined voltage is applied to the DC motor for a predetermine time to drive the DC motor, so as to move and stop the optical pickup together with a carriage (hereafter referred to as "thread"), then the stop position of the optical pickup is likely to significantly vary depending on the optical disc apparatus, because the load of the moving thread (hereafter referred to as "thread load") is likely to vary depending on the optical disc apparatus. It may be possible to provide a thread-driving gear with a thread sensor having an encoder, so as to detect the position of the optical pickup and control the movement/stop of the optical pickup, making it possible to accurately stop the optical pickup at a specified position. However, this causes a cost increase due to the thread sensor.

On the other hand, an optical disc apparatus is known which uses a stepping motor for moving an optical pickup so as to detect the position of the optical pickup based on the number of pulses for driving the stepping motor, thereby accurately stopping the optical pickup (refer to e.g. Japanese Laid-open Patent Publication 2000-251270). However, the stepping motor in such optical pickup device has a low torque, so that it is not possible to use the stepping motor in common for moving the optical pickup and for moving a tray of an optical disc. Thus, an additional motor is needed for driving the tray, which causes a cost increase of the optical disc apparatus.

Further, an optical disc apparatus is known which provides, at an innermost circumferential position of an optical disc, a limit switch operated and turned on by an optical pickup. When the optical pickup is moved in a direction directed to the inner circumferential side to turn on the limit switch, the moving direction of the optical pickup is changed to a direction to the outer circumferential side, while a predetermined voltage is applied for a predetermined time to, and thereby drive, a motor for moving the optical pickup, so as to move the optical pickup to a reading position (refer to e.g. Japanese Laid-open Patent Publication Hei 4-241229). However, since this optical disc apparatus does not consider variations of thread loads, it causes variations in the rezero operation.

Similarly, an optical disc apparatus is known which provides, at an innermost circumferential position of an optical disc, a limit switch operated and turned on by an optical pickup. When the optical pickup is moved in a direction directed to the inner circumferential side to turn on the limit switch, the moving direction of the optical pickup is changed to a direction to the outer circumferential side, while a predetermined voltage is applied for a predetermined time to, and thereby drive, a motor for moving the optical pickup. Thereafter, a predetermined reverse voltage is applied to, and thereby brake, the motor (refer to e.g. Japanese Laid-open Patent Publication 2005-332525). If the optical pickup has a low thread load to be easily movable, it absorbs the variations of thread loads, because it enables a strong brake effect. However, if there are significant variations of thread loads, the variations cannot be sufficiently absorbed, causing variations in the rezero operation.

SUMMARY OF THE INVENTION

An object of the present invention is to provide an optical disc apparatus which can absorb variations of thread loads without requiring the use of a thread sensor, thereby reducing variations in a rezero operation of an optical pickup and achieving cost reduction.

According to the present invention, this object is achieved by an optical disc apparatus comprising: an optical pickup unit for irradiating a laser beam onto an optical disc to record/reproduce data on/from the optical disc, the optical pickup unit having a thread load; a thread motor for moving the optical pickup unit in one direction directed to an inner circumferential side or outer circumferential side of the optical disc; and a control unit for controlling the entire optical disc apparatus. Therein, the optical disc apparatus further comprises a circumferential switch to be turned on when the optical pickup unit is moved to arrive at an inner or outer circumference of the optical disc. When a power supply to the optical disc apparatus is turned on, the control unit applies a driving voltage to the thread motor to drive the thread motor so as to move the optical pickup unit in a direction directed to the inner circumferential side or outer circumferential side of the optical disc, and then stops driving the thread motor when the circumferential switch is turned on. The control unit then changes the moving direction to an opposite direction to the one direction, and gradually increases the driving voltage applied to the thread motor to start moving the optical pickup means in the opposite direction, thereby causing the circumferential switch to be turned off after the optical pickup starts moving in the opposite direction. The driving voltage applied to the thread motor, when the circumferential switch is turned off after the optical pickup starts moving in the opposite direction, is set by the control unit as an automatically adjusted value of the driving voltage of the thread motor which value corresponds to the thread load. Thereafter, the control unit uses the automatically adjusted value to drive the thread motor for moving the optical pickup unit without using a thread sensor.

This optical disc apparatus makes it possible to absorb variations of thread loads among different optical disc apparatus, i.e. to adapt or adjust itself to the thread load therein, because the driving voltage applied to the thread motor for driving the optical pickup unit, at the time the circumferential switch is turned off from on, is set as an automatically adjusted value of the driving voltage, and because this automatically adjusted value, which corresponds to the thread load of the optical pickup unit, is used to drive the thread motor. This in turn makes it possible to reduce the variation in the stop position of the optical pickup unit in the rezero operation. Furthermore, the optical disc apparatus does not require a thread sensor, or performs all operations and processes without using a thread sensor, thereby achieving cost reduction.

Preferably, the optical disc apparatus further comprises a memory unit storing a program therein. The control unit controls the entire optical disc apparatus based on the program in the memory unit. The circumferential switch is an inner circumferential switch to be turned on when the optical pickup unit is moved to an innermost circumference of the optical disc. The thread motor is a DC motor. Further, the control unit stores the automatically adjusted value in the memory unit, and moves the optical pickup unit in a direction directed to the inner circumferential side of the optical disc when the power supply to the optical disc apparatus is turned on. This facilitates the automatic adjustment to the thread load of the optical pickup unit.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 3A is a time chart showing ON/OFF timing of an inner circumferential switch in the optical disc apparatus, while

DESCRIPTION OF THE PREFERRED EMBODIMENTS

Embodiments of the present invention, as the best mode for carrying out the invention, will be described hereinafter with reference to the annexed drawings.

Figure 1:
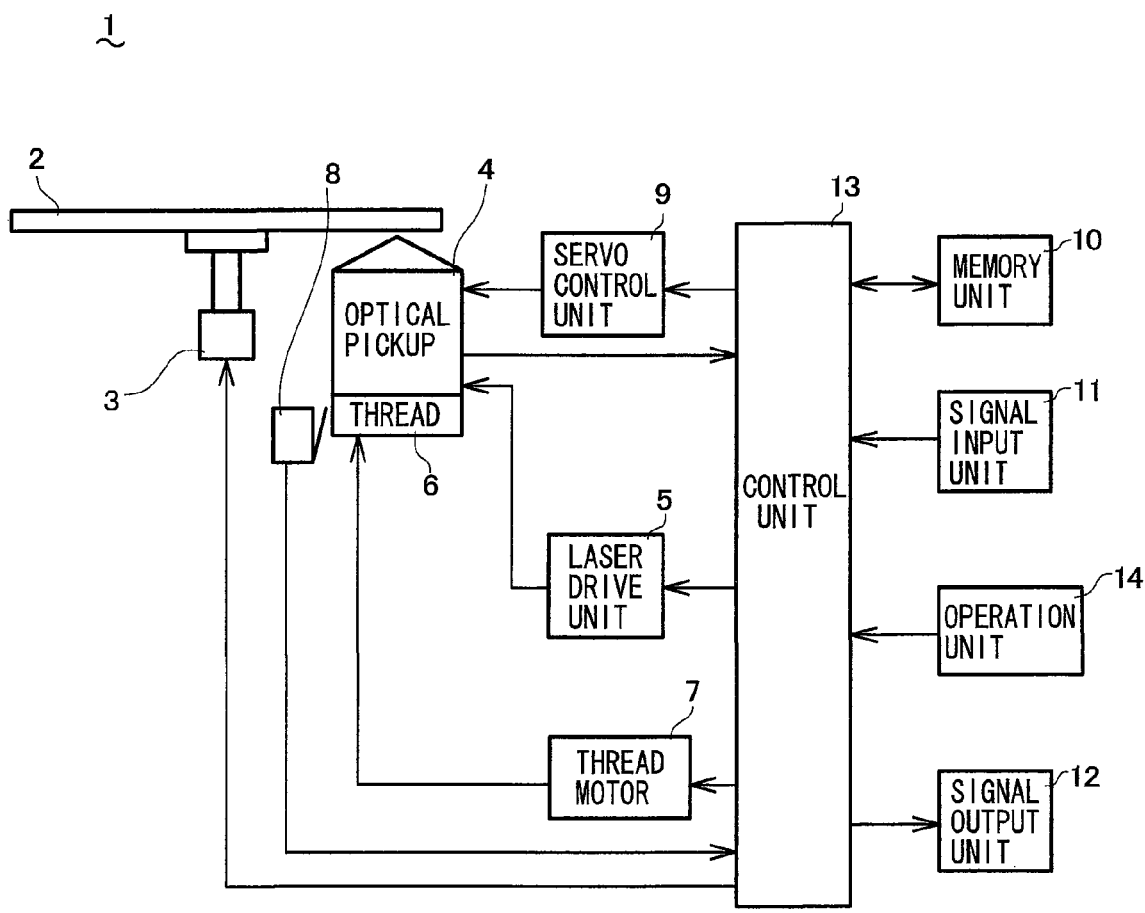
FIG. 1 is a schematic block diagram of an optical disc apparatus according to an embodiment of the present invention.

Referring to FIG. 1, which is a schematic block diagram of an optical disc apparatus 1 according to an embodiment of the present invention, the optical disc apparatus 1 will be described. The optical disc apparatus 1 comprises: a spindle motor 3 for rotating an optical disc 2 mounted on a turntable; an optical pickup 4 (claimed "optical pickup unit") for irradiating a laser beam onto the optical disc 2 to record/reproduce data on/from the optical disc 2; a laser drive unit 5 for sending a laser modulation signal to the optical pickup 4 to drive the optical pickup 4; a thread 6 (claimed "optical pickup unit") which is a carriage for transporting the optical pickup 4; and a thread motor 7 for moving the optical pickup 4 with the thread 6 in a radial direction of the optical disc 2. Here, a DC motor is used as the thread motor 7.

The optical disc apparatus 1 further comprises: an inner circumferential switch (claimed "circumferential switch") 8 to be mechanically pressed and turned on by the thread 6 when the optical pickup 4 is moved to arrive at an innermost circumference of the optical disc 2; a servo control unit 9 for controlling focus and tracking of the optical pickup 5; and a control unit 13 for controlling the entire optical disc apparatus 1, or more specifically, the respective units and elements described above. The control unit 13 has connected thereto: a memory unit 10 storing a program and data therein; a signal input unit 11 for inputting data such as video and audio data; a signal output unit 12 for outputting reproduced data from the optical disc 2; and an operation unit 14 operated by a user to command the control unit 13. The inner circumferential switch 8 has a lever which, when pressed and released, turns on and off the inner circumferential switch 8, respectively. The control unit 13 controls the entire optical disc apparatus 1 based on the program in the memory unit 10.

The optical pickup 4 comprises a semiconductor laser diode (not shown) for emitting a laser beam to the optical disc 2 as well as a photodetector (not shown) for receiving reflected light of the laser beam reflected from the optical disc 2 to generate an electrical signal. This semiconductor laser diode irradiates a high power laser beam onto the optical disc 2 so as to record data thereon. On the other hand, the photodetector sends, to the control unit 13, the electrical signal which is a reproduced signal generated based on the reflected light from the optical disc 2, so as to reproduce data recorded on the optical disc 2. The thus arranged optical disc apparatus 1 is used, for example, as a DVD (Digital Versatile Disc) recorder and a DVD drive installed in a personal computer, in which e.g. a DVD-RW (Digital Versatile Disc-Rewritable) is used as the optical disc 2.

Figure 2:
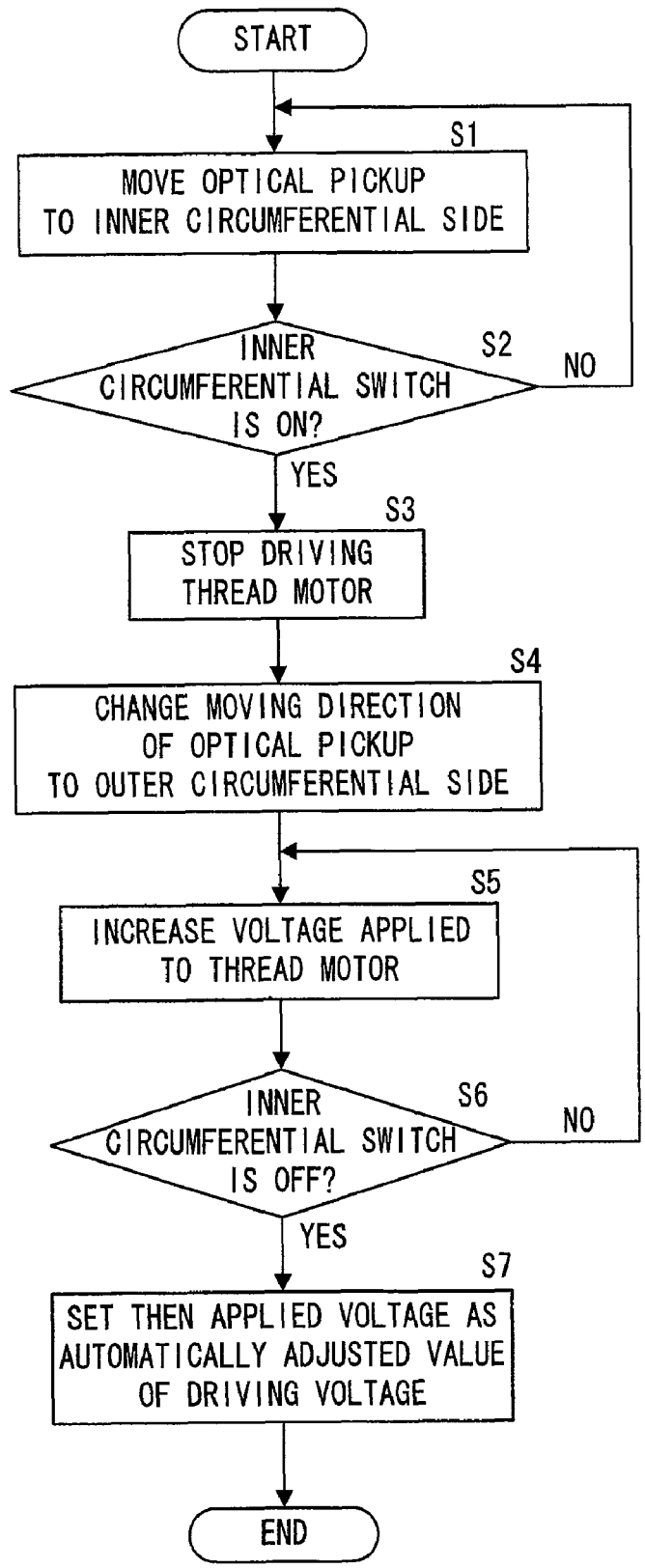
FIG. 2 is a flow chart for obtaining an automatically adjusted value of a driving voltage of a thread motor in the optical disc apparatus.
Figure 3A:
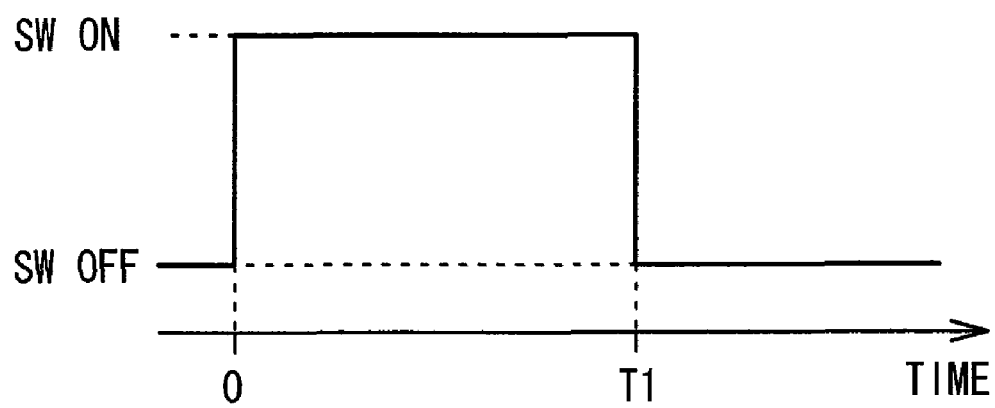
Figure 3B:
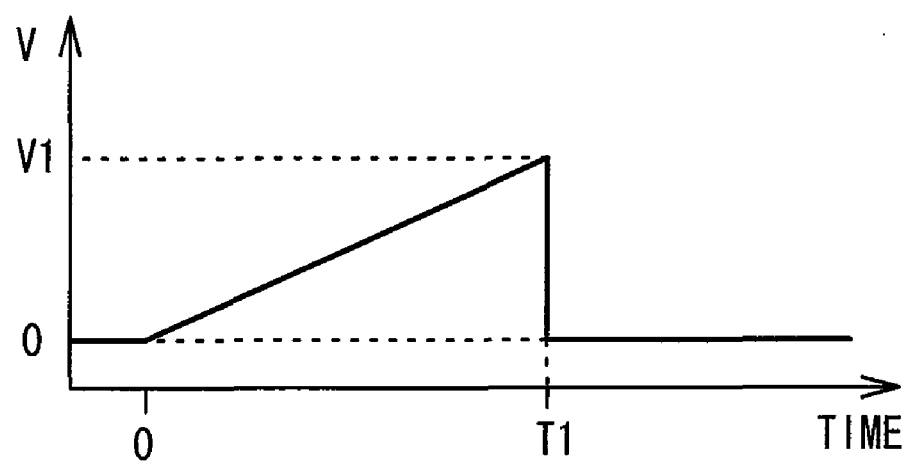
FIG. 3B is a graph showing the variation with time of a driving voltage applied to the thread motor, showing a relationship between an automatically adjusted value of the driving voltage of the thread motor and the ON/OFF timing of the inner circumferential switch.

Next, the operation of the optical disc apparatus 1 according to the present embodiment as described above will be described with reference to FIG. 2 and FIG. 3. FIG. 2 is a flow chart for obtaining an automatically adjusted value of a driving voltage of the thread motor 7. On the other hand, FIG. 3A is a time chart showing ON/OFF timing of the inner circumferential switch 8, while FIG. 3B is a graph showing the variation with time of a driving voltage applied to the thread motor 7, showing a relationship between an automatically adjusted value of the driving voltage of the thread motor 7 and the ON/OFF timing of the inner circumferential switch 8.

When a power supply is turned on and supplied to the optical disc apparatus 1 with a loaded optical disc 2, the control unit 13 performs control so that a driving voltage of one polarity is applied to the thread motor 7, so as to drive the thread motor 7 to move the optical pickup 4 in a direction to the inner circumferential side of the optical disc 2 (S1). When the optical pickup 4 is moved to an innermost circumference of the optical disc 2 to allow the thread 6 to press the lever of the inner circumferential switch 8, the inner circumferential switch 8 is turned on, so that an ON signal of the inner circumferential switch 8 is sent to the control unit 13 (S2). The control unit 13 stops driving the thread motor 7 (S3) in response to the ON signal.

The control unit 13 then reverses the polarity of the driving voltage applied to the thread motor 7 so as to change the moving direction of the optical pickup 4 to a direction which is directed to the outer circumferential side of the optical disc 2 or opposite to the direction to the inner circumferential side of the optical disc 2 (S4), and gradually increases the driving voltage applied to the thread motor from 0 (zero) V (S5). Thereby, the optical pickup 4 starts moving in a direction directed to the outer circumferential side of the optical disc 2, which causes the contact pressure of the thread 6 on the lever of the inner circumferential switch 8 to be released, thereby causing the inner circumferential switch 8 to be turned OFF from the ON state (S6) (refer to FIG. 3). Thus, an OFF signal of the inner circumferential switch 8 is sent to the control unit 13.

The driving voltage then applied to the thread motor 7, i.e. applied voltage V1 at time T1 when the inner circumferential switch 8 is turned OFF from ON after the optical pickup 4 starts moving in the direction to the outer circumferential side of the optical disc 2, is stored in the memory unit 10 by the control unit 13, and thereby set, as an automatically adjusted value of the driving voltage of the thread motor 7 (S7). Thereafter, the control unit 13 uses this automatically adjusted value V1 to drive the thread motor 7 for moving the optical pickup 4. As described in the Description of the Related Art, when moving the optical pickup 4 with the thread 6, it causes a load ("thread load") of the moving thread 6 with the optical disc pickup 4. Thus, it can be said that the optical pickup unit has a thread load.

If the optical disc apparatus 1, or more specifically the optical pickup unit, has a low thread load, the optical pickup 4 can be moved by a low applied voltage, so that the automatically adjusted value becomes small. On the other hand, if the optical disc apparatus 1 or the optical pickup unit has a high thread load, a high applied voltage is required to move the optical pickup 4, so that the automatically adjusted value becomes large. In this way, the automatically adjusted value corresponds to the thread load of the optical disc apparatus 1, or more specifically of the optical pickup unit. Thus, the optical disc apparatus 1 achieves an automatic adjustment to the thread load of the optical pickup unit thereof. Further, it can be said that the automatically adjusted value V1 absorbs variations of thread loads.

As described in the Description of the Related Art, when the optical disc 2 is loaded in the optical disc apparatus 1, it is required to accurately move the optical pickup 4 to a predetermined reading start position ("rezero position") so as to read certain data recorded in an innermost circumferential area of the optical disc 2 ("rezero operation"). In order to perform a rezero operation after an automatically adjusted value V1 is determined, the control unit 13 applies a voltage of the automatically adjusted value V1 to the thread motor 7 for a predetermined time while the moving direction of the optical pickup 4 is maintained in the direction directed to the outer circumferential side of the optical disc 2, so as to move the thread 6 to a rezero position.

Since the automatically adjusted value V1 absorbs variations of thread loads, the optical pickup 4 can be stopped at an accurate rezero position by applying a predetermined driving voltage to the thread motor 7 for a predetermined time. In this way, the optical disc apparatus 1 makes it possible to drive the thread motor 7 by an automatically adjusted value which corresponds to the thread load of the optical disc apparatus 1, namely, which corresponds to a thread load in each of different optical disc apparatus, thereby absorbing variations of thread loads. The absorption of variations of thread loads, in turn, makes it possible to reduce the variation in the stop position of the optical pickup 4 in the rezero operation. Furthermore, the optical disc apparatus 1 does not require a thread sensor, or performs all operations and processes without using a thread sensor, thereby achieving cost reduction.

It is to be noted that the present invention is not limited to the above-described specific embodiments, and various modifications can be made within the scope of the present invention. For example, the circumferential switch, which is the inner circumferential switch 8 in the above-described embodiments, can be an outer circumferential switch (not shown) to be mechanically pressed and turned on by the thread 6 when the optical pickup 4 is moved to arrive at an outermost circumference of the optical disc 2. The operation of this modified optical disc apparatus is such that when the power supply to the apparatus is turned on, the optical pickup 4 is moved in a direction to the outer circumferential side of the optical disc 2 to turn on the outer circumferential switch.

When the outer circumferential switch is turned on, the driving of the thread motor 7 is stopped, and the moving direction of the optical pickup 4 is changed to a direction directed to the inner circumferential side of the optical disc 2 or opposite to the direction directed to the outer circumferential side of the optical disc. Then, the driving voltage applied to the thread motor 7 is gradually increased to move the optical pickup 4 in a direction to the inner circumferential side of the optical disc 2, thereby turning off the outer circumferential switch. The driving voltage applied to the thread motor 7, at the time the outer circumferential switch is turned off, is set and used as an automatically adjusted value of the driving voltage of the thread motor 7 in the modified optical disc apparatus. Furthermore, the inner circumference switch 7 or the outer circumferential switch can not only be the mechanical switch, but also a sensor such as a photo sensor. In addition, the control unit 13 can use not only a voltage of the automatically adjusted value, but also a voltage e.g. 1.2 times as high as the automatically adjusted value, as a voltage applied to drive the thread motor 7 for moving the optical pickup 4.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus comprising:

an optical pickup unit for irradiating a laser beam onto an optical disc to record/reproduce data on/from the optical disc, the optical pickup unit having a thread load;

a thread motor for moving the optical pickup unit in one direction directed to an inner circumferential side or outer circumferential side of the optical disc; and a control unit for controlling the entire optical disc apparatus, wherein the optical disc apparatus further comprises a circumferential switch to be turned on when the optical pickup unit is moved to arrive at an inner or outer circumference of the optical disc, wherein when a power supply to the optical disc apparatus is turned on, the control unit applies a driving voltage to the thread motor to drive the thread motor so as to move the optical pickup unit in a direction directed to the inner circumferential side or outer circumferential side of the optical disc, and then stops driving the thread motor when the circumferential switch is turned on, wherein the control unit then changes the moving direction to an opposite direction to the one direction, and gradually increases the driving voltage applied to the thread motor to start moving the optical pickup unit in the opposite direction, thereby causing the circumferential switch to be turned off after the optical pickup starts moving in the opposite direction, wherein the driving voltage applied to the thread motor, when the circumferential switch is turned off after the optical pickup starts moving in the opposite direction, is set by the control unit as an automatically adjusted value of the driving voltage of the thread motor which value corresponds to the thread load, and wherein thereafter the control unit uses the automatically adjusted value to drive the thread motor for moving the optical pickup unit without using a thread sensor.

2. The optical disc apparatus according to claim 1, which further comprises a memory unit storing a program therein, wherein the control unit controls the entire optical disc apparatus based on the program in the memory unit, wherein the circumferential switch is an inner circumferential switch to be turned on when the optical pickup unit is moved to an innermost circumference of the optical disc, wherein the thread motor is a DC motor, and wherein the control unit stores the automatically adjusted value in the memory unit, and moves the optical pickup unit in a direction directed to the inner circumferential side of the optical disc when the power supply to the optical disc apparatus is turned on.

* * * * *